(12) United States Patent
Zaremba

(10) Patent No.: US 6,509,711 B1
(45) Date of Patent: Jan. 21, 2003

(54) DIGITAL ROTOR FLUX OBSERVER

(75) Inventor: Alexander Timofeevich Zaremba, Dearborn Heights, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/558,499

(22) Filed: Apr. 26, 2000

(51) Int. Cl.[7] ............................................. H02P 5/34
(52) U.S. Cl. ...................... 318/800; 318/801; 318/802; 318/803; 318/804; 318/805; 318/806; 318/811; 318/812; 318/813
(58) Field of Search ................................. 318/801–806, 318/811–813

(56) References Cited

U.S. PATENT DOCUMENTS

| | | | |
|---|---|---|---|
| 4,707,651 A | | 11/1987 | Schauder |
| 4,777,422 A | * | 10/1988 | Slicker et al. ............. 318/800 |
| 5,296,793 A | | 3/1994 | Lang |
| 5,296,794 A | * | 3/1994 | Lang et al. ................ 318/715 |
| 5,365,158 A | * | 11/1994 | Tanaka et al. ............. 318/806 |
| 5,541,488 A | * | 7/1996 | Bansai et al. ............. 318/801 |
| 5,585,709 A | | 12/1996 | Jansen |
| 5,708,346 A | | 1/1998 | Schöb |
| 5,729,113 A | * | 3/1998 | Jansen et al. ............. 318/799 |
| 5,796,235 A | * | 8/1998 | Schrodl et al. ............ 318/801 |
| 5,796,236 A | | 8/1998 | Royak |
| 5,973,474 A | * | 10/1999 | Yamamoto ................. 318/801 |
| 6,014,006 A | * | 1/2000 | Stuntz et al. ............. 318/804 |
| 6,069,467 A | * | 5/2000 | Jansen ..................... 318/802 |
| 6,137,258 A | * | 10/2000 | Jansen ..................... 318/802 |
| 6,163,127 A | * | 12/2000 | Patel et al. ............... 318/700 |

* cited by examiner

*Primary Examiner*—Robert E. Nappi
*Assistant Examiner*—Tyrone Smith
(74) *Attorney, Agent, or Firm*—Jennifer Stec

(57) ABSTRACT

A system (10) for controlling the torque of an induction motor (12) utilizes a flux observer (14). The flux observer (14) receives stator current inputs (16, 18) and a rotor speed estimate (80) and then outputs a rotor flux estimate (20) that provides increased motor control stability at all speeds.

15 Claims, 2 Drawing Sheets

DIGITAL ROTOR FLUX OBSERVER

TECHNICAL FIELD

The present invention relates to a system for controlling an electric induction motor and, more particularly, to rotor flux observer design for controlling an electric induction motor.

BACKGROUND OF THE PRESENT INVENTION

Typical induction motors include a rotor mounted inside a stator for rotation about a rotation axis. A common rotor design includes a "squirrel cage winding" in which axial conductive bars are connected at either end by shorting rings to form a generally cylindrical structure. The stator is formed by a plurality of winding which surround the rotor and are typically arranged in three separate phases. Time varying voltage is applied across the stator windings which generate an electromotive force (emf) and an associated stator magnetic field which rotates around the stator at a stator field frequency primarily within the space defined by the rotor.

As the stator field rotates about the rotor, relative motion between the stator field flux and the rotor bars induces voltages in the rotor at a slip frequency. Slip is the difference between the stator frequency. Slip is the difference between the stator field frequency and the rotor electrical speed. The voltages induced in the rotor cause rotor bar currents, which in turn generate a rotor magnetic field. The stator and rotor fields are stationary with respect to each other, but are separated by a changeable rotor angle (a). The two fields interact to produce torque, which causes rotor rotation. The amount of motor torque for an induction motor will vary as the voltages induced in the rotor change.

It is known that for efficient control of an induction motor, the rotor position must be measured or estimated. A rotor position sensor is typically employed to sense the position of the rotor and feed it directly to a controller or other device that is controlling the operation of the motor. Based on a reading from the position sensor, in field oriented control of an induction motor, the orientation of rotor flux is determined and the stator voltage signal is calculated. While position sensors have been widely used for sensing the rotor position, they can be unreliable, are relatively noisy, and are relatively expensive.

Various control schemes for torque control of induction motors (IM) without the use of a position sensor have been employed. These IM torque control schemes include as a part the flux estimation procedure, the rotor flux observer, which is based on the following known rotor flux dynamic equation:

$$\frac{d\hat{\lambda}_r}{dt} = \left(-\frac{R_r}{L_r}I + \omega_r J\right)\hat{\lambda}_r + \frac{R_r}{L_r}Mi_s \quad (1)$$

$$\text{Where } \hat{\lambda}_r = \begin{bmatrix} \hat{\lambda}_{rx} \\ \hat{\lambda}_{ry} \end{bmatrix}, i_s = \begin{bmatrix} i_{xs} \\ i_{ys} \end{bmatrix}, I = \begin{bmatrix} 1 & 0 \\ 0 & 1 \end{bmatrix}, J = \begin{bmatrix} 0 & -1 \\ 1 & 0 \end{bmatrix} \quad (2)$$

In the equations above, $\hat{\lambda}_r$ is the rotor flux estimation, $i_s$ is the stator current, and $\omega_r$ is the rotor electrical speed and $R_r$, $L_r$, and M are the rotor resistance, rotor inductance, and machine mutual inductance, respectively.

For higher rotor speeds, the discrete implementation of equation (1), shown below:

$$\hat{\lambda}_{rk+1} = \hat{\lambda}_{rk} + T\left[\left(-\frac{R_r}{L_r}I + \omega_{rk}J\right)\hat{\lambda}_{rk} + \frac{R_r}{L_r}Mi_{sk}\right] \quad (3)$$

where T is a sampling period, can be numerically unstable. The solution of (1) is oscillatory with frequency $\omega_r$, and the simple Euler integration method implemented in equation (3) is not adequate for high rotor speeds. Thus, an improved solution for controlling the motor torque that operates reliably at all speeds would be advantageous.

SUMMARY OF THE INVENTION

It is an object of the present invention to provide a discrete time flux observer for torque control of induction motors.

It is another object of the present invention to provide a flux observer that provides significantly improved performance at high rotor speeds.

It is yet another object of the present invention to provide a flux observer that provides an accurate flux estimation that provides increased endurance and ease of maintenance preserving high dynamic performance.

In accordance with the above and other objects of the present invention, a system for controlling the torque of an induction motor is provided. The system includes a controller that receives a signal which is representative of the motor stator current. The controller also receives information on the rotor speed. The actual rotor speed or the estimated rotor speed is then fed to a flux observer. The flux observer calculates the rotor flux which is necessary to calculate the stator voltage to control the output torque of the induction motor. The observer is a discrete time flux observer that utilizes analytical solutions of the rotor flux dynamic equation over a time sampling interval and thus provides higher accuracy and improved performance over standard Euler or Tustin approximations.

These and other features of the present invention will become apparent from the following description of the invention, when viewed in accordance with the accompanied drawings and appended claims.

BEST MODE(S) FOR CARRYING OUT THE INVENTION

Figure 1:
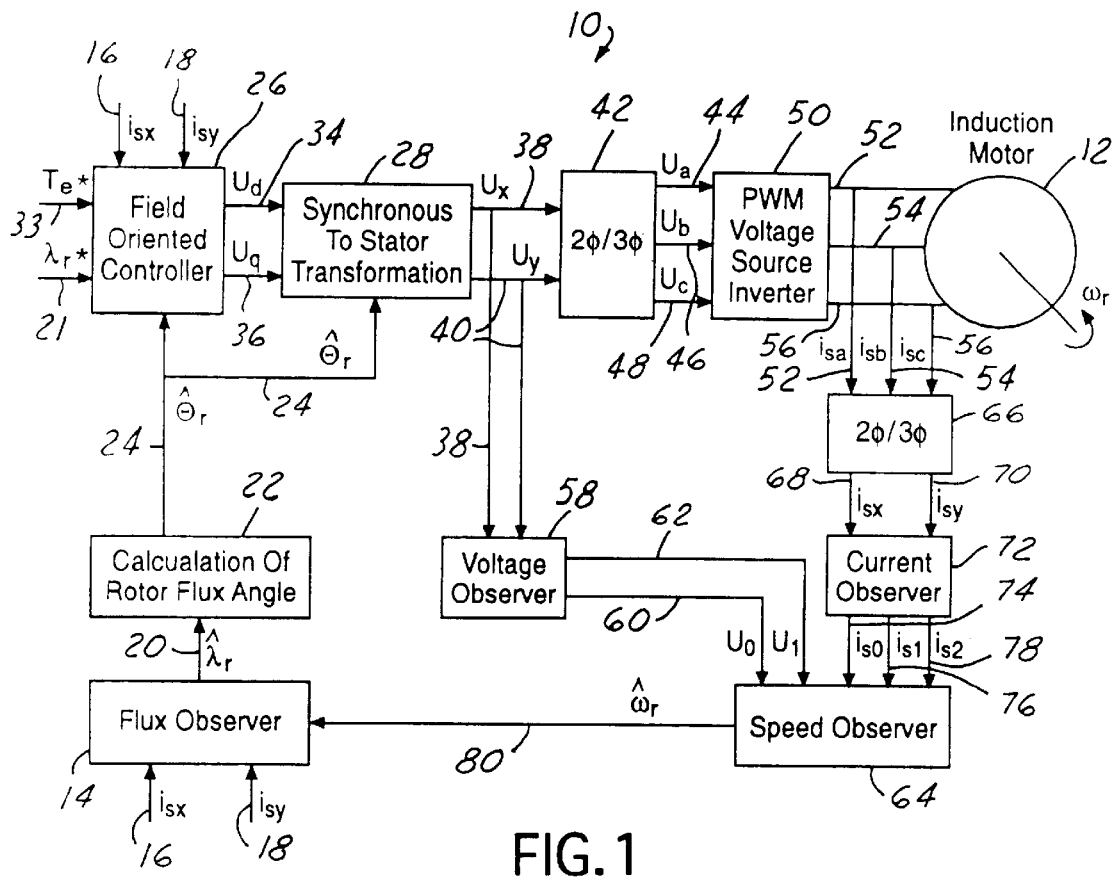
FIG. 1 is a block diagram of a sensorless field orientation control scheme in accordance with a preferred embodiment of the present invention.

Referring now to FIG. 1, which illustrates a sensorless field orientation control system 10 in accordance with the present invention. The components of the control system 10, which are used to control the torque of an induction motor 12, are briefly and generally described below, as the basic configuration is well known. It should be understood that the control system 10 is merely exemplary and a variety of other components and configurations may be utilized. Further, the induction motor 12 can be incorporated into a variety of applications, including both automotive and non-automotive. An example of an automotive application in which the induction motor 12 can be used is in an electronic power assisted steering system.

For example, as shown in FIG. 1, a flux observer 14 is provided with two current inputs. The first current input ($i_{sx}$) 16 is the x component of the stator current while the second current input ($i_{sy}$) 18 is the y component of the stator current. The flux observer 14 outputs the rotor flux ($\lambda_r$) which is determined as set forth below and is generally indicated by line 20. Thereafter, the rotor flux angle ($\theta_r$) is calculated, as generally represented by reference number 22, and is output as generally indicated by line 24. The output 24, indicative of the rotor flux angle, is fed to a field oriented controller 26 and is also used to assist in the synchronous to stator transformation, which is generally indicated by reference number 28.

The field oriented controller 26 determines the stator voltage in the frame related to the rotor magnetic field and controls the (d, q) components of stator current according to standard techniques which are well known in the art. The field oriented controller 24 is provided with various inputs, including the reference value of the rotor flux ($\lambda_r^*$), as generally indicated by line 21, the motor torque reference signal ($T_e^*$), as generally indicated by line 33, the stator x current input ($i_{sx}$) 16, and the stator y current input ($i_{sy}$) 18. The field oriented controller 26 outputs a first voltage component output ($u_d$), as generally indicated by reference number 34, and a second voltage component output ($u_q$), as generally indicated by reference number 36. These voltage outputs 34, 36 are transformed from the synchronous to stator frame in block 28.

The synchronous to stator transformation, as indicated by reference number 28, outputs an x component of the voltage ($u_x$) as generally indicated by reference number 38 and a y component of the voltage ($u_y$) is generally indicated by reference number 40. The voltage components 38 and 40 are then fed into a two phase to three phase converter 42. The two phase to three phase converter transforms the x component of voltage ($u_x$) 38 and the y component of voltage ($u_y$) 40 into three voltage phases represented by ($u_a$) as indicated by reference number 44, ($u_b$) as indicated by reference number 46, and ($u_s$) as indicated by reference number 48. The three voltage phases ($u_a$), ($u_b$) and ($u_s$), are input into a phase wave modulator voltage source inverter 50, which inputs the three voltage phases ($u_a$), ($u_b$) and ($u_s$), into corresponding stator windings and the three stator current signals ($i_{sa}$, $i_{sb}$, $i_{sc}$) are measured and generally indicated by reference numbers 52, 54 and 56, respectively.

Additionally, the x component of voltage ($u_x$) 38 and the y component of voltage ($u_y$) 40 are also fed to a voltage observer 58, which then outputs two voltage components ($u_o$) as indicated by reference number 60 and ($u_l$) as indicated by reference number 62, which are then fed to the speed observer 64. The current signals from the stator windings ($i_{sa}$, $i_{sb}$ and $i_{sc}$) are then input into a three phase to two phase converter 66 which generates two current outputs ($i_{sx}$) 68 and ($i_{sy}$) 70. The current output 68, 70 are then fed into a current observer 72. The current observer generates current output ($i_{so}$), as indicated by reference number 74, ($i_{s1}$) as indicated by reference number 76, and ($i_{s2}$) as indicated by reference number 78. The current outputs 74, 76, 78 are then fed into the speed observer 64. The speed observer 64 outputs a signal 80 which represents the rotor speed estimation ($\hat{\omega}_r$). The rotor speed estimation ($\hat{\omega}_r$) is then fed into the flux observer 14.

Figure 2:
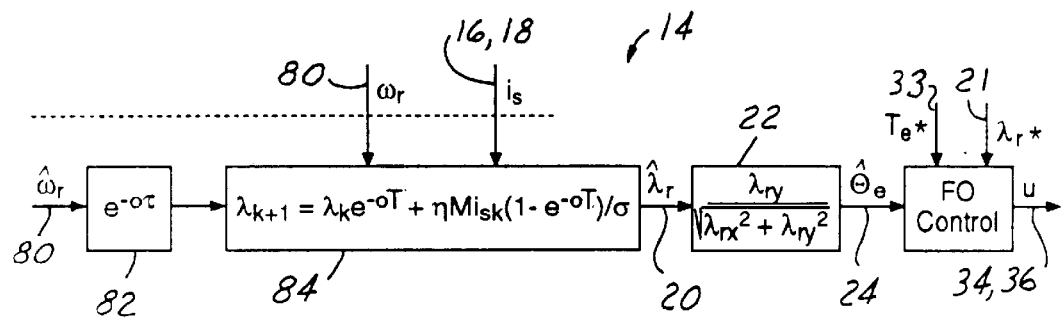
FIG. 2 is a block diagram of a discrete time flux observer for torque control of an induction motor in accordance with a preferred embodiment of the present invention.

Referring now to FIG. 2, which schematically illustrates the digital rotor flux observer 14 in accordance with the present invention. The digital rotor flux observer 14 is designed based upon a zero order hold (ZOH) approach and analytical solutions of the flux dynamic equation. In order to overcome the instability experienced by prior flux observers that are based on standard approximations, equation (1) set forth above is transformed, in accordance with the present invention, to discrete time using ZOH approximation.

Straightforward implementation of ZOH approximation requires a set of discrete models which are calculated off line over the range of the rotor speed. This requires high memory resources and essential work on preliminary observer calibration. To avoid this, an analytical solution for the flux observer design is suggested. The design of the flux observer 14 is based on the scalar form of the rotor dynamic equation using complex variables for flux and current. Thus, rewriting equation (1) in scalar form with complex variables for flux and current results in the following discrete time equation:

$$\frac{d\lambda_r}{dt} = (-\eta + j\omega_r)\lambda_r + \eta M i_s \text{ where} \tag{4}$$

$$\lambda_r = \lambda_{rx} + j\lambda_{ry}, i_s = i_{sx} + ji_{sy}, \eta = \frac{R_r}{L_r} \text{ and } j = \sqrt{(-1)}.$$

By using the analytical solution of equation (4) above, the flux observer 14 is preferably designed in accordance with the following equation over the sampling interval [kT,(k+1)T]:

$$\lambda_{k+1} = \lambda_k e^{\int_{kT}^{(k+1)T}[\eta+j\omega(s)]ds} + \eta M \int_{kT}^{(k+1)T} i(t) e^{\int_{kT}^{t}[\eta+j\omega(s)]ds} dt \tag{5}$$

In accordance with the present invention, it is assumed that the rotor speed $\omega(s)$ is constant over the sampling interval set forth in equation (5). Thus, the rotor speed estimation ($\hat{\omega}_r$) 80 is input into the flux observer 14. Given that the speed dependant exponent can be written as a constant $\sigma = \eta - j\omega$ the exponential in equation (5) can thus be expressed as $e^{-\sigma\tau}$, as shown in FIG. 2. Equation (5) can therefore be simplified, as the rotor speed is assumed to be constant over a sampling interval, and expressed in the form of equation (6) below:

$$\lambda_r(t) = \lambda_{ro} e^{-\sigma(t-t_o)} + \eta M \int_{t_o}^{t} e^{\sigma(\tau-t)} i_s d\tau \tag{6}$$

Accordingly, by using equation (6), the discrete form of the flux observer, which includes the speed as a parameter, is then calculated as follows:

$$\lambda_{rk+1} = \lambda_k e^{-\sigma T} + \eta M i_{sk} 1 - \frac{e^{-\sigma T}}{\sigma} \tag{7}$$

The discrete form of the flux observer is represented generally by reference number 84. The variable T is the sampling period. After recovering the scalar components of the rotor flux from equation (7), the analytical digital form of the flux observer 14 is calculated, as set forth below:

$$\lambda_{rx(k+1)} = (1-\alpha)\lambda_{rxk} - \beta\lambda_{ryk} + \frac{\eta M}{\eta^2 + \omega_r^2}[(\eta\alpha + \omega_r\beta)i_{sx} - (\omega_r\alpha - \eta\beta)i_{sy}] \quad (8)$$

$$\lambda_{ry(k+1)} = (1-\alpha)\lambda_{ryk} - \beta\lambda_{rxk} + \frac{\eta M}{\eta^2 + \omega_r^2}[(\eta\alpha + \omega_r\beta)i_{sy} - (\omega_r\alpha - \eta\beta)i_{sx}]$$

where $\alpha = 1 - e^{-\eta T}\cos\omega_r T \quad \beta = e^{-\eta T}\sin\omega_r T$ In accordance with the present invention, equations (8) are the discrete ZOH approximation of the continuous equation (1). The rotor speed ($\hat{\omega}_r$) 80 and the stator current ($i_s$) 16, 18 are parameters that are inputs into the flux observer 14 to arrive at the discrete time instance. The rotor flux angle ($\hat{\theta}_r$) is preferably determined at 22 in accordance with the equation $\lambda_{ry}/(\sqrt{\lambda_{rx}^2 + \lambda_{ry}^2}) = \cos\hat{\theta}_r$ and then input to the field oriented controller 26.

Figure 3:
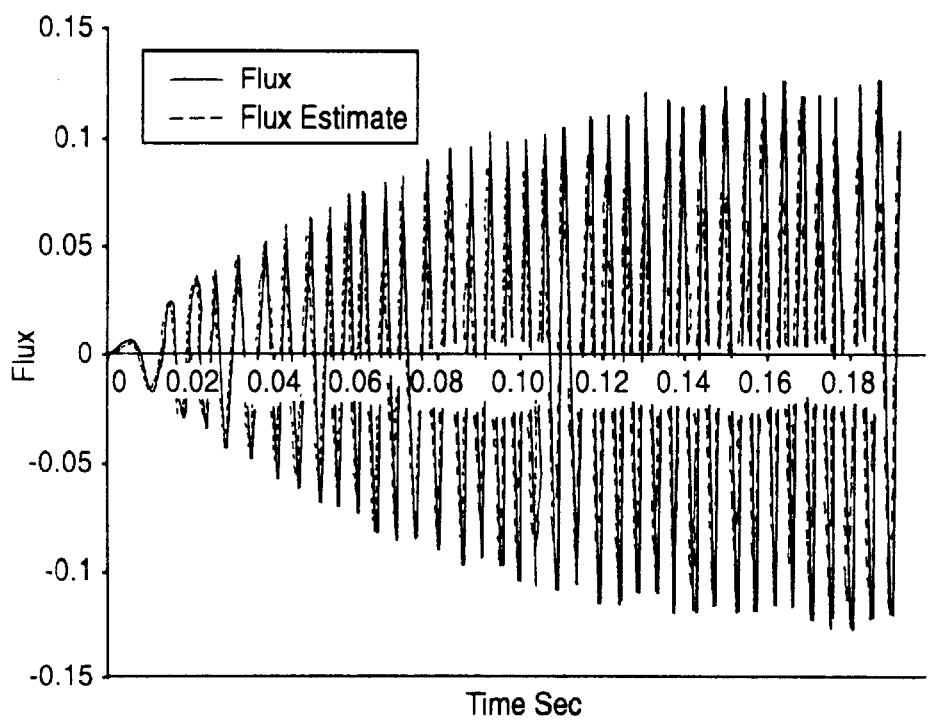
FIG. 3 is a graph illustrating an estimation of one component of the rotor flux using the rotor speed estimated value in accordance with a preferred embodiment of the present invention.
Figure 4:
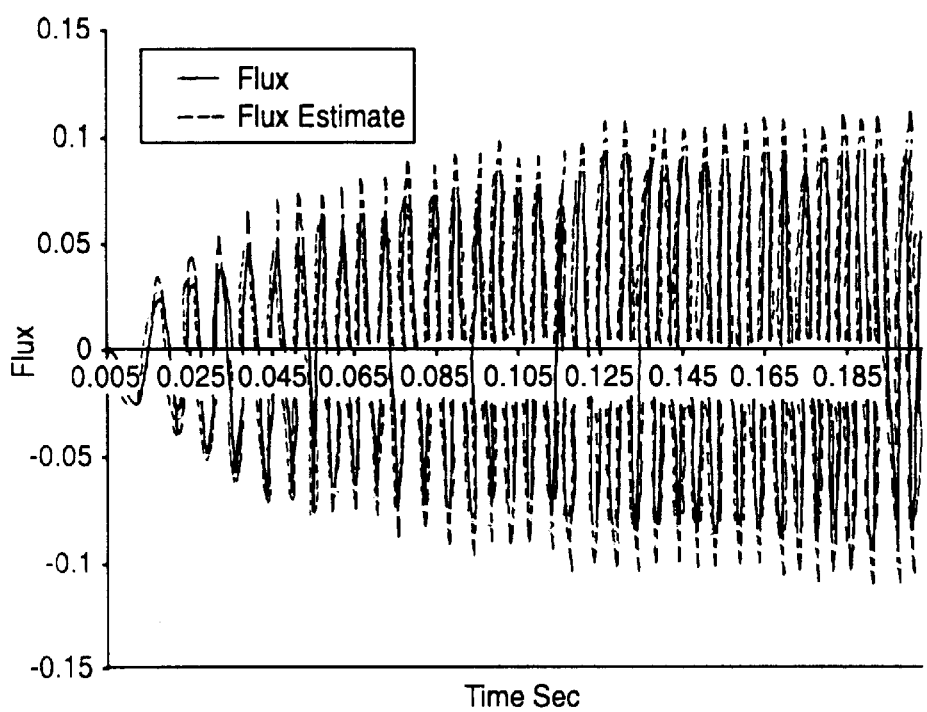
FIG. 4 is a graph illustrating an estimation of the rotor flux with a fifty percent (50%) variation in the rotor time constant in accordance with a preferred embodiment of the present invention.

The plots in FIGS. 3 and 4 show the result of the estimation of the rotor flux $\hat{\lambda}_r$ for the modeling of engine idle active damping using an induction motor (IM) with parameters given in Table 1 below:

| $R_s$ (ohm) | $R_r$ (ohm) | $L_r$ (H) | $L_s$ (H) | M (H) | $\eta\left(\frac{1}{\sec}\right)$ |
|---|---|---|---|---|---|
| .15 | .0187 | .0011 | .0011 | .00081 | 17 |

FIG. 3 plots the flux on the y-axis versus time in seconds on the x-axis. FIG. 3 illustrates the estimation of one component of the rotor flux as determined by the flux observer 14 in accordance with equations (8) and a sampling frequency of IKHZ using the rotor speed estimated value. The flux observer of the present invention that operates in accordance with equation (8) demonstrate good performance, while the estimation based on the standard algorithm (3) is unstable.

FIG. 4 shows that the rotor flux observer 14 of the present invention is robust to motor parameter variations. For example, FIG. 4 illustrates a flux estimator for a fifty percent (50%) variation of the rotor time constant. As shown, the flux estimate is higher during transient. However, the flux phase, which is important for the control, is not affected by variations in the rotor time constant The flux observer 14 of equations of the present invention, thus provides an accurate flux estimator at all speeds, including at high speeds where solution is oscillatory and prior estimations failed. The disclosed flux observer 14 is robust with respect to motor parameter variations. For example, varying the rotor time constant changes the amplitude of flux estimate during transient, but the phase of the flux estimate and the rotor angle estimate remain essentially unchanged. Thus, implementation of the disclosed flux observer 14 eliminates the need for a position sensor, reduces cost and improves reliability while preserving the system high dynamic performance.

Having now fully described the invention, it will be apparent to one of ordinary skill in the art that many changes and modifications can be made thereto without departing from the spirit or scope of the invention as set forth herein.

What is claimed is:

1. A method of utilizing a rotor flux observer to control the torque of an induction motor, having a rotor and a stator, comprising:

receiving a signal indicative of the stator current at the rotor flux observer;

receiving a signal representative of the rotor speed at the rotor flux observer;

calculating an exponent of said rotor speed signal;

estimating the rotor flux based on the assumption that the rotor speed is constant over a sampling interval determining a discrete form of the rotor flux;

estimating a rotor flux angle;

calculating a voltage to be used in controlling the motor torque, based on a field orientation scheme.

2. A method of utilizing a rotor flux observer to control the torque of an induction motor, having a rotor and a stator, comprising:

receiving a signal indicative of the stator current at the rotor flux observer;

receiving a signal representative of the rotor speed at the rotor flux observer;

calculating an exponent of said rotor speed signal;

estimating the rotor flux based on the assumption that the rotor speed is constant over a sampling interval;

determining a discrete form of the rotor flux;

recovering scalar components of the rotor flux to obtain a flux estimated volume, wherein said scalar components of the rotor flux are determined according to the following equations:

$$\lambda_{rx(k+1)} = (1-\alpha)\lambda_{rxk} - \beta\lambda_{ryk} + \frac{\eta M}{\eta^2 + \omega_r^2}[(\eta a + \omega_r\beta)i_{sx} - (\omega_r a - \eta\beta)i_{sy}]$$

$$\lambda_{ry(k+1)} = (1-\alpha)\lambda_{ryk} + \beta\lambda_{rxk} + \frac{\eta M}{\eta^2 + \omega_r^2}[(\eta a + \omega_r\beta)i_{sy} - (\omega_r a - \eta\beta)i_{sx}]$$

estimating a rotor flux angle;

calculating a voltage to be used in controlling the motor torque, based on a field orientation scheme.

3. The method of claim 1, wherein said rotor flux angle is estimated according to the following equation:

$$\cos\hat{\theta}_r = \frac{\lambda_{ry}}{\sqrt{\lambda_{ry}^2 + \lambda_{ry}^2}}$$

4. The flux observer of claim 2, wherein said rotor speed signal is received from a speed observer.

5. The flux observer of claim 4, wherein said speed observer receives current inputs and voltage inputs from a current observer and a voltage observer respectively.

6. The flux observer of claim 2, wherein said rotor flux angle is determined according to the following equation:

$$\cos\hat{\theta}_r = \frac{\lambda_{ry}}{\sqrt{\lambda_{ry}^2 + \lambda_{ry}^2}}$$

7. A discrete time flux observer for torque control of an induction motor, the induction motor having a rotor and a stator, comprising:

a rotor speed input for receiving a signal indicative of the rotor speed;

a stator current input for receiving a signal indicative of the stator current;

a rotor flux estimating mechanism that estimates the rotor flux based on the assumption that the rotor speed is constant over a sampling interval;

a rotor flux output for outputting said estimated rotor flux;

a flux angle calculation for receiving said estimated rotor flux and determining a rotor flux angle; and a field oriented controller for receiving said determined rotor flux angle and determining a stator voltage;

wherein the flux observer is used to control an induction motor that is incorporated into a vehicle electronic power assisted steering system.

8. The flux observer of claim 7, wherein a discrete form of said rotor flux observer is expressed as follows:

$$\lambda_{rk+1} = \lambda_k e^{-\sigma T} + \eta M i_{sk} \frac{i - e^{-\sigma T}}{\sigma}$$

9. The flux observer of claim 8, wherein the rotor flux observer analytical digital form is determined as follows:

$$\lambda_{rx(k+1)} = (1-\alpha)\lambda_{rxk} - \beta\lambda_{ryk} + \frac{\eta M}{\eta^2 + \omega_r^2}[(\eta\alpha + \omega_r\beta)i_{sx} - (\omega_r\alpha - \eta\beta)i_{sy}] \quad (8)$$

$$\lambda_{ry(k+1)} = (1-\alpha)\lambda_{ryk} - \beta\lambda_{rxk} + \frac{\eta M}{\eta^2 + \omega_r^2}[(\eta\alpha + \omega_r\beta)i_{sy} - (\omega_r\alpha - \eta\beta)i_{sx}].$$

10. The control scheme of claim 9, wherein the flux observer receives a pair of current inputs with the first current input being representative of the x component of the stator current and the second current input being representative of the y component of the stator current.

11. The control scheme of claim 9, wherein said flux observer output or estimated rotor flux which is then used to determine a rotor flux angle.

12. The control scheme of claim 11, wherein a discrete form of said rotor flux is expressed in accordance with the following equation:

$$\lambda_{rk+1} = \lambda_k e^{-\sigma T} + \eta M i_{sk} \frac{1 - e^{-\sigma T}}{\sigma}.$$

13. The control scheme of claim 12, wherein an analytical digital form of said flux observer is determined as follows:

$$\lambda_{rx(k+1)} = (1-\alpha)\lambda_{rxk} - \beta\lambda_{ryk} + \frac{\eta M}{\eta^2 + \omega_r^2}[(\eta\alpha + \omega_r\beta)i_{sx} - (\omega_r\alpha - \eta\beta)i_{sy}] \quad (8)$$

$$\lambda_{ry(k+1)} = (1-\alpha)\lambda_{ryk} - \beta\lambda_{rxk} + \frac{\eta M}{\eta^2 + \omega_r^2}[(\eta\alpha + \omega_r\beta)i_{sy} - (\omega_r\alpha - \eta\beta)i_{sx}].$$

14. A sensorless field orientation control scheme for controlling an induction motor, comprising:

a flux observer for determining a rotor flux;

a speed observer in communication with said flux observer to provide said flux observer with a signal indicative of the rotor speed;

a voltage observer in communication with said speed observer to provide said speed observer with a signal representative of the filtered motor voltage;

a current observer to provide said speed observer with a signal representative of the filtered motor current; and a field oriented controller in communication with said flux observer to control the torque of the motor;

whereby said flux observer estimates said motor flux based on the assumption that the motor speed is constant over a sampling interval and wherein the inductive motor is incorporated into a vehicle electronic power assisted steering system.

15. The control scheme of claim 11, wherein said rotor flux angle is determined according to the following equation:

$$\cos\hat{\theta}_r = \frac{\lambda_{ry}}{\sqrt{\lambda_{ry}^2 + \lambda_{ry}^2}}.$$

* * * * *

UNITED STATES PATENT AND TRADEMARK OFFICE
CERTIFICATE OF CORRECTION

PATENT NO.    : 6,509,711 B1
DATED         : January 21, 2003
INVENTOR(S)   : Alexander Timofeevich Zaremba It is certified that error appears in the above-identified patent and that said Letters Patent is hereby corrected as shown below:

Column 6,
Lines 24-25, replace to read as follows:

--
$$\lambda_{rx(k+1)} = (1-\alpha)\lambda_{rxk} - \beta\lambda_{ryk} + \frac{\eta M}{\eta^2 + \omega_r^2}\left[(\eta\alpha + \omega_r\beta)i_{sx} - (\omega_r\alpha - \eta\beta)i_{sy}\right]$$

$$\lambda_{ry(k+1)} = (1-\alpha)\lambda_{ryk} + \beta\lambda_{rxk} + \frac{\eta M}{\eta^2 + \omega_r^2}\left[(\eta\alpha + \omega_r\beta)i_{sy} - (\omega_r\alpha - \eta\beta)i_{sx}\right]$$
--

Signed and Sealed this

Sixth Day of January, 2004

JAMES E. ROGAN
*Director of the United States Patent and Trademark Office*